(12) United States Patent
Chen et al.

(10) Patent No.: US 11,870,346 B2
(45) Date of Patent: Jan. 9, 2024

(54) DC-DC CONVERTER

(71) Applicant: Huawei Digital Power Technologies Co., Ltd., Shenzhen (CN)

(72) Inventors: Dong Chen, Shanghai (CN); Lei Shi, Shanghai (CN); Zhaohui Wang, Nuremberg (DE)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 17/548,963

(22) Filed: Dec. 13, 2021

(65) Prior Publication Data
US 2022/0103070 A1 Mar. 31, 2022

Related U.S. Application Data

(63) Continuation of application No. PCT/CN2019/127191, filed on Dec. 20, 2019.

(51) Int. Cl.
*H02M 3/158* (2006.01)
*H02M 1/32* (2007.01)
(Continued)

(52) U.S. Cl.
CPC .............. *H02M 3/158* (2013.01); *H02M 1/32* (2013.01); *H02M 1/36* (2013.01); *H02M 3/07* (2013.01)

(58) Field of Classification Search
CPC .......... H02M 3/07; H02M 3/073; H02M 7/10; H02M 7/103; H02M 7/106; H02M 1/088;
(Continued)

(56) References Cited

U.S. PATENT DOCUMENTS 10,063,147 B2 * 8/2018 Høyerby ............. H02M 7/4837
11,283,354 B2 * 3/2022 Zhuang ............... H02M 7/4837
(Continued)

FOREIGN PATENT DOCUMENTS

CN 104253555 A 12/2014
CN 104868727 A 8/2015
(Continued)

OTHER PUBLICATIONS

J. Rodriguez ; Jih-Sheng Lai ; Fang Zheng Peng, "Multilevel inverters: a survey of topologies, controls, and applications", IEEE Transactions on Industrial Electronics, vol. 49, No. 4, Aug. 2002,Total 15 Pages.

*Primary Examiner* — Jeffrey A Gblende
(74) *Attorney, Agent, or Firm* — WOMBLE BOND DICKINSON (US) LLP

(57) ABSTRACT

A DC-DC converter includes: a first capacitor, a second capacitor, a first switch device, a second switch device, a third switch device, a fourth switch device, a flying capacitor, where one end of the flying capacitor is coupled to the first intermediate node, the other end of the flying capacitor is coupled the second intermediate node; and the protective circuit, including a clamping unit and a buffering unit, where when a voltage between the positive end of the bus and the negative end of the bus increases, the clamping unit clamps the first switch device to a voltage of the first capacitor, and clamps the fourth switch device to a voltage of the second capacitor, and the buffering unit reduces a current flowing through the clamping unit and the flying capacitor.

17 Claims, 11 Drawing Sheets

(51) Int. Cl.
*H02M 1/36* (2007.01)
*H02M 3/07* (2006.01)

(58) Field of Classification Search
CPC ..... H02M 2003/071; H02M 2003/072; H02M 2003/075; H02M 2003/076; H02M 2003/077; H02M 2003/078; H02M 2001/007; H02M 2001/0048; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069

See application file for complete search history.

(56) References Cited

U.S. PATENT DOCUMENTS

| 2013/0021011 | A1* | 1/2013 | Okuda ................ H02M 7/4837 323/282 |
| 2016/0329810 | A1 | 11/2016 | Lee et al. |
| 2019/0214904 | A1* | 7/2019 | Yu ....................... H02M 7/4837 |

FOREIGN PATENT DOCUMENTS

| CN | 207625308 U | 7/2018 |
| CN | 108462381 A | 8/2018 |
| CN | 108471235 A | 8/2018 |
| CN | 109687713 A | 4/2019 |
| CN | 109742947 A | 5/2019 |
| CN | 109756115 A | 5/2019 |
| EP | 3855612 A1 | 7/2021 |
| WO | 2019184442 A1 | 10/2019 |
| WO | 2021115032 A1 | 6/2021 |

\* cited by examiner

DC-DC CONVERTER

CROSS-REFERENCE TO RELATED APPLICATIONS

This application is a continuation of International Application No. PCT/CN2019/127191, filed on Dec. 20, 2019, the disclosure of which is hereby incorporated by reference in its entirety.

TECHNICAL FIELD

This application relates to the field of energy technologies, and in particular, to a DC-DC converter.

BACKGROUND

A DC-DC converter configured to implement conversion between a direct current voltage and a direct current voltage is widely applied to systems such as a solar power generation system, an energy storage system, and an uninterruptible power supply (UPS) system.

In DC-DC converters, a multi-level circuit can provide a plurality of voltage values, and therefore draws attention. For example, FIG. 1 is a schematic structural diagram of a three-level direct current (DC)-direct current conversion circuit. The DC-DC conversion circuit includes an upper bridge arm, a lower bridge arm, a flying capacitor, and an inductor. The upper bridge arm includes two diodes (D1 and D2) connected in series. Two ports obtained after D1 and D2 are connected in series are respectively connected to a positive end P of a bus and a reference end O, and an intermediate node is marked as SP. The lower bridge arm includes two IGBTs (T3 and T4) connected in series and diodes (D3 and D4) that are anti-parallel connected to T3 and T4. Two ports obtained after T3 and T4 are connected in series are respectively connected to the reference end O and a negative end N of the bus, and an intermediate node is marked as SN. A positive end of the flying capacitor Cfly is connected to the intermediate node SP, and a negative end of the flying capacitor is connected to the intermediate node SN. Two ends of the inductor Lin are respectively connected to a low-voltage positive end L and the reference end O. A low-voltage negative end is directly connected to the negative end of the bus, and is also marked as N. A voltage at the positive end P of the bus is Vbus, a voltage of an intermediate node M of the bus is Vbus/2, and a voltage at the negative end of the bus is 0. When the circuit works normally, the reference end O may have three level states. Therefore, the circuit is referred to as the three-level DC-DC conversion circuit. An output direct current voltage can be adjusted by controlling a turn-on time and turn-off time of each switch device in the circuit.

Before the DC-DC conversion circuit shown in FIG. 1 works normally, the flying capacitor Cfly is first charged to a voltage of Vbus/2 by using an additional precharging circuit. After the DC-DC conversion circuit is normally started, a voltage between the two ends of the flying capacitor Cfly (that is, a voltage between SP and SN) is about Vbus/2. When T3 and T4 are on, the reference end O is connected to the negative end N of the bus, and a voltage at the reference end O is 0; when D2 and T4 are on, a voltage at the reference end O is equal to the voltage Vbus/2 between the two ends of the flying capacitor Cfly; when T3 and D1 are on, a voltage at the reference end O is equal to the voltage at the positive end P of the bus minus the voltage between the two ends of the flying capacitor Cfly, that is, Vbus/2; when D2 and D1 are on, the reference end O is connected to the positive end P of the bus, and a voltage is Vbus. Therefore, the reference end O has three level states: 0, Vbus/2, and Vbus.

The three-level DC-DC conversion circuit shown in FIG. 1 has the following problem: When some abnormal working conditions occur, some devices in the circuit have a risk of overvoltage damage.

For example, when the low-voltage positive end L is mistakenly connected to a negative voltage (that is, the low-voltage positive end L and the low-voltage negative end N are reversely connected), it is assumed that the low-voltage positive end L should be connected to a voltage of 1200 V but is mistakenly connected to a voltage of −1200 V due to negligence. In this case, a voltage at the low-voltage negative end N is 0 V. Therefore, D3 and D4 are turned on, a voltage of the intermediate node SN is 0 V, and a voltage borne by D1 is a difference between Vbus and a voltage on Cfly. If Cfly is not yet precharged at this moment, D1 bears a comparatively high voltage, which causes a risk of overvoltage damage. For another example, when the circuit works normally, if the voltage at the positive end P of the bus suddenly jumps to a higher voltage, for example, jumps from 900 V to 1400 V, because the voltage between the two ends of Cfly has not yet changed and is still 900 V/2=450 V, when D1 is on, a voltage borne by T4 is the voltage at the positive end P of the bus minus the voltage between the two ends of the flying capacitor Cfly, that is, 1400 V−450 V=950 V. As a result, the transistor T4 bears a comparatively high voltage, which causes a risk of overvoltage damage.

Therefore, for the three-level DC-DC conversion circuit provided in the prior art, an abnormal working condition is difficult to deal with.

SUMMARY

Embodiments of this application provide a DC-DC converter, to resolve a prior-art problem that it is difficult for a three-level DC-DC conversion circuit to deal with an abnormal working condition.

According to a first aspect, an embodiment of this application provides a DC-DC converter. The DC-DC converter includes a first switch device, a second switch device, a third switch device, a fourth switch device, a first capacitor, a second capacitor, a flying capacitor, and a protective circuit. One end of the first capacitor is connected to a positive end of a bus, and the other end of the first capacitor is connected to an intermediate node of the bus. One end of the second capacitor is connected to the intermediate node of the bus, and the other end of the second capacitor is connected to a negative end of the bus. One end of the first switch device is connected to the positive end of the bus, and another end of the first switch device is connected to a first intermediate node. One end of the second switch device is connected to the first intermediate node, and another end of the second switch device is connected to a reference end. One end of the third switch device is connected to the reference end, and another end of the third switch device is connected to a second intermediate node. One end of the fourth switch device is connected to the second intermediate node, and another end of the fourth switch device is connected to the negative end of the bus. A positive end of the flying capacitor is connected to the first intermediate node, and a negative end of the flying capacitor is connected to the second intermediate node. The first intermediate node and the second intermediate node are connected to the intermediate node of the bus by using the protective circuit.

The protective circuit includes a clamping unit and a buffering unit. The clamping unit is configured to: when a voltage between the positive end of the bus and the negative end of the bus increases, clamp the first switch device to a voltage of the first capacitor, and clamp the fourth switch device to a voltage of the second capacitor. The buffering unit is configured to reduce, when the voltage between the positive end of the bus and the negative end of the bus increases, a current flowing through the clamping unit and the flying capacitor.

In use of the DC-DC converter provided in the first aspect, when a low-voltage positive end is mistakenly connected to a negative voltage, a voltage at the negative end of the bus is 0 V, and a voltage at the low-voltage positive end is the negative voltage; therefore, the third switch device and the fourth switch device are turned on, and a voltage of the second intermediate node is 0 V. Because the DC-DC converter has not yet started working, and the flying capacitor is not yet precharged, a voltage between the two ends of the flying capacitor is 0 V. Therefore, a voltage of the first intermediate node is also 0 V. In this case, if the first capacitor and the second capacitor already have voltages, the flying capacitor is charged from the intermediate node of the bus through the protective circuit, the first intermediate node, and the second intermediate node, and finally charged to a voltage equal to that of the second capacitor. In addition, the first switch device is clamped by the protective circuit to a voltage of the first capacitor, thereby avoiding a risk of overvoltage damage.

When a voltage at the positive end of the bus suddenly jumps up, the flying capacitor may be charged by using the protective circuit. The clamping unit in the protective circuit clamps the first switch device to the voltage of the first capacitor, and clamps the fourth switch device to the voltage of the second capacitor, thereby reducing a risk of overvoltage damage to the first switch device and the fourth switch device. In addition, the buffering unit in the protective circuit reduces a current shock during charging of the flying capacitor, thereby improving reliability of each device in a charging loop.

When the DC-DC converter works normally and performs voltage equalization control on the flying capacitor, a voltage of the flying capacitor may be further adjusted by adjusting turn-on and turn-off times of the first switch device, the second switch device, the third switch device, and the fourth switch device. The voltage between the two ends of the flying capacitor may be greater than the voltage of the first capacitor and greater than the voltage of the second capacitor.

When the voltage between the two ends of the flying capacitor is greater than the voltage of the first capacitor and greater than the voltage of the second capacitor, if an abnormal working condition in which the voltage at the positive end P of the bus suddenly jumps up occurs, during charging of the flying capacitor, a difference between a final charging voltage and an instantaneous voltage that is of the flying capacitor and that is generated when the abnormal working condition occurs is further reduced, and therefore, a current shock during charging of the flying capacitor can be reduced. This further improves reliability of each device in the charging loop. In addition, when the voltage between the two ends of the flying capacitor is greater than the voltage of the first capacitor and greater than the voltage of the second capacitor, during normal working of the DC-DC converter, a voltage of the intermediate node M of the bus is less than a voltage of the first intermediate node and is greater than a voltage of the second intermediate node, and a clamping unit in the protective circuit cannot be turned on; therefore, the protective circuit does not participate in normal working of the DC-DC converter. In other words, the protective circuit protects a device in the DC-DC converter only when an abnormal working condition occurs, and the protective circuit does not participate in working when the DC-DC converter works normally.

In an embodiment, the DC-DC converter provided in the first aspect may further include a first inductor. One end of the first inductor is connected to the low-voltage positive end, the other end of the first inductor is connected to the reference end, and the negative end of the bus is coupled to a low-voltage negative end. Alternatively, one end of the first inductor is connected to a low-voltage negative end, the other end of the first inductor is connected to the reference end, and the positive end of the bus is coupled to the low-voltage positive end.

In an embodiment, in the DC-DC converter, the low-voltage positive end and the low-voltage negative end are input ends of the circuit, and the positive end of the bus and the negative end of the bus are output ends of the circuit; alternatively, the positive end of the bus and the negative end of the bus are input ends of the circuit, and the low-voltage positive end and the low-voltage negative end are output ends of the circuit.

It should be understood that the DC-DC converter provided in the first aspect may be a unidirectional converter, or may be a bidirectional converter. When the DC-DC converter is the bidirectional converter, if the positive end of the bus and the negative end of the bus are used as input ends, the low-voltage positive end and the low-voltage negative end are used as output ends. In this case, the DC-DC converter is configured to convert a direct current voltage between the positive end of the bus and the negative end of the bus into a direct current voltage between the low-voltage positive end and the low-voltage negative end. Alternatively, if the low-voltage positive end and the low-voltage negative end are used as input ends, the positive end of the bus and the negative end of the bus are used as output ends. In this case, the DC-DC converter is configured to convert a direct current voltage between the low-voltage positive end and the low-voltage negative end into a direct current voltage between the positive end of the bus and the negative end of the bus.

In the DC-DC converter provided in the first aspect, the clamping unit may include a first clamping device and a second clamping device. One end of the first clamping device is connected to the first intermediate node, and another end of the first clamping device is connected to the second clamping device. One end of the second clamping device is connected to the second intermediate node, and another end of the second clamping device is connected to the first clamping device. One end of the buffering unit is connected to a connection node between the first clamping device and the second clamping device, and another end of the buffering unit is connected to the intermediate node of the bus.

Further, the first clamping device may be a first diode, and the second clamping device may be a second diode. Alternatively, the first clamping device may be a first insulated gate bipolar transistor IGBT and a diode that is anti-parallel connected to the first IGBT, and the second clamping device may be a second IGBT and a diode that is anti-parallel connected to the second IGBT. Alternatively, the first clamping device may be a first metal-oxide semiconductor field-effect transistor MOSFET and a body diode of the first MOSFET, and the second clamping device may be a second MOSFET and a body diode of the second MOSFET. A cathode of the diode in the first clamping device is connected to the first intermediate node, and an anode of the diode in the first clamping device is connected to a cathode of the diode in the second clamping device. An anode of the diode in the second clamping device is connected to the second intermediate node.

In other words, each of the first clamping device and the second clamping device includes a diode (for example, the first clamping device includes the first diode and the second clamping device includes the second diode, or the first clamping device includes the anti-parallel diode of the IGBT and the second clamping device includes the anti-parallel diode of the IGBT, or the first clamping device includes the body diode of the MOSFET and the second clamping device includes the body diode of the MOSFET), the two diodes are connected in series between the first intermediate node and the second intermediate node, and an intermediate node between the two diodes is connected to the intermediate node M of the bus by using the buffering unit.

In an embodiment, the buffering unit includes at least one of the following: a first buffer resistor; a third IGBT and a diode that is anti-parallel connected to the third IGBT, and a fourth IGBT and a diode that is anti-parallel connected to the fourth IGBT, where the third IGBT and the fourth IGBT are connected in opposite direction; a third MOSFET and a body diode of the third MOSFET, and a fourth MOSFET and a body diode of the fourth MOSFET, where the third MOSFET and the fourth MOSFET are connected in opposite direction; or a second buffer resistor, a third buffer resistor, and a fifth switch device, where the second buffer resistor and the third buffer resistor are connected in series, and the fifth switch device and the third buffer resistor are connected in parallel.

The fifth switch device is any one of the following: a mechanical switch device; a fifth IGBT and a diode that is anti-parallel connected to the fifth IGBT; or a fifth MOSFET and a body diode of the fifth MOSFET.

It is not difficult to learn that a main body of the buffering unit is a resistor, and a specific form of the resistor may be a resistor with a fixed resistance value, may be an adjustable resistor implemented by using an IGBT and a diode that is anti-parallel connected to the IGBT, may be an adjustable resistor implemented by using an MOSFET and a body diode of the MOSFET, or may be an adjustable resistor adjusted by using a switch device. When the buffering unit includes the resistor, during charging of the flying capacitor in an abnormal working condition, a current shock to the flying capacitor and another device in a charging loop can be reduced, and a risk of overvoltage damage to a device can be reduced.

In an embodiment, the first switch device, the second switch device, the third switch device, and the fourth switch device each include an IGBT and an anti-parallel diode of the IGBT, or an MOSFET and a body diode of the MOSFET; alternatively, the first switch device and the second switch device each include an IGBT and an anti-parallel diode of the IGBT, or an MOSFET and a body diode of the MOSFET, and the third switch device and the fourth switch device each include a diode; alternatively, the first switch device and the second switch device each include a diode, and the third switch device and the fourth switch device each include an IGBT and an anti-parallel diode of the IGBT, or an MOSFET and a body diode of the MOSFET.

According to the foregoing solution, if the first switch device, the second switch device, the third switch device, and the fourth switch device each include an IGBT and an anti-parallel diode of the IGBT, or an MOSFET and a body diode of the MOSFET, the DC-DC converter provided in the first aspect may be a bidirectional converter.

In an embodiment, the protective circuit is further configured to precharge the flying capacitor when the circuit starts.

According to the foregoing solution, the flying capacitor may be precharged from the low-voltage positive end through the following loop: the second switch device→the protective circuit→the intermediate node of the bus→the negative end of the bus. Therefore, there is no need to additionally dispose a precharging circuit. This reduces costs.

DESCRIPTION OF EMBODIMENTS

Figure 1:
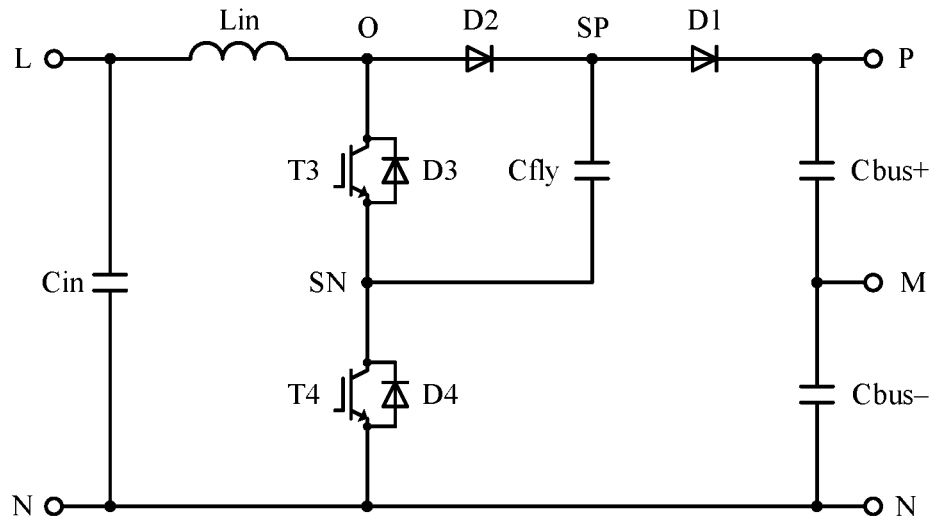
FIG. 1 is a schematic structural diagram of a three-level DC-DC conversion circuit according to the prior art.
Figure 2:
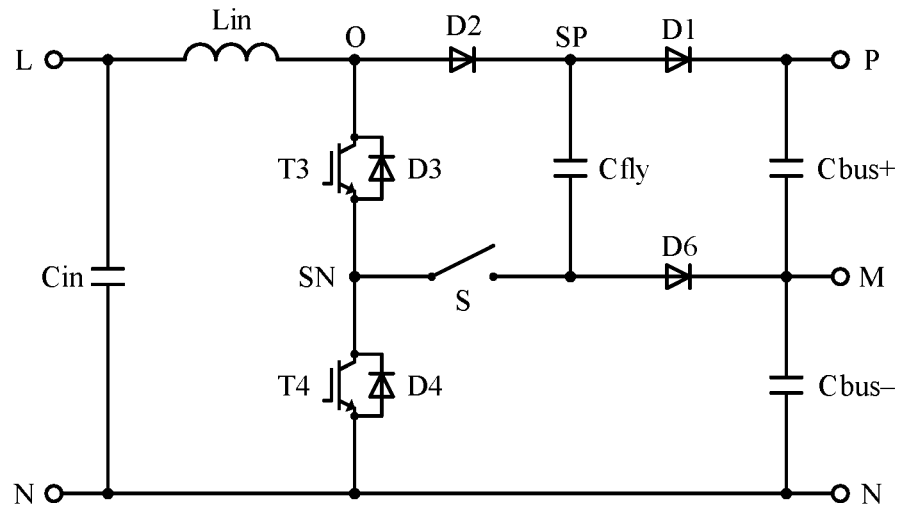
FIG. 2 is a schematic structural diagram of another three-level DC-DC conversion circuit according to the prior art.

In the prior art, to resolve the problem presented in the background that it is difficult for a three-level DC-DC conversion circuit to deal with an abnormal working condition, improvement is performed on a three-level DC-DC conversion circuit shown in FIG. 1, and an improved three-level DC-DC conversion circuit may be shown in FIG. 2.

The conversion circuit shown in FIG. 2 is obtained by adding a switch S and a diode D6 to a conversion circuit topology shown in FIG. 1. A negative end of a flying capacitor Cfly is connected to an intermediate node SN by using the switch S. In addition, the negative end of the flying capacitor Cfly is connected to an intermediate node M of a bus by using the diode D6.

The conversion circuit shown in FIG. 2 may directly precharge the flying capacitor Cfly without using an additional precharging circuit. When the conversion circuit is normally started from a low-voltage positive end L, the flying capacitor Cfly may be precharged from the low-voltage positive end through an inductor Lin→a diode D2→the diode D6→Cbus-. Therefore, a conventional precharging circuit is unnecessary.

For a case in which the low-voltage positive end L is mistakenly connected to a negative voltage, a working principle of the conversion circuit shown in FIG. 2 is as follows: Before the conversion circuit starts to work, the switch S remains open. If the low-voltage positive end L is connected to a negative voltage, D3 and D4 are turned on, and a voltage of the intermediate node SN is 0. In this case, because the flying capacitor Cfly is not yet charged, a voltage between two ends of the flying capacitor Cfly is 0, and therefore, a bus voltage Vbus is borne jointly by D1 and the switch S. That is, compared with the conversion circuit shown in FIG. 1, the conversion circuit shown in FIG. 2 avoids, by using the added switch S, a risk of overvoltage damage to D1 that is caused when the bus voltage Vbus is borne by D1 alone. After the circuit is normally started, the switch S remains closed.

For a case in which a bus voltage suddenly jumps, a working principle of the conversion circuit shown in FIG. 2 is as follows: After the conversion circuit works normally, if the bus voltage suddenly jumps to a higher voltage when a voltage between two ends of the flying capacitor Cfly has not yet changed, the flying capacitor Cfly is charged through the diode D6 and Cbus- when D1 is on. Because S is closed and D6 is on, a voltage between two ends of T4 is the same as a voltage between two ends of Cbus-. That is, the added diode D6 clamps T4 to a negative voltage source of the bus, thereby reducing a risk of overvoltage damage to T4. Still using an example that is mentioned in the background and in which a voltage at a positive end P of the bus jumps from 900 V to 1400 V, when the conversion circuit shown in FIG. 2 is used, T4 is clamped to 700 V. Compared with the conversion circuit shown in FIG. 1, a voltage borne by T4 is reduced (from 950 V to 700 V). Therefore, a risk of overvoltage damage to T4 is reduced by using the conversion circuit shown in FIG. 2.

Although the conversion circuit shown in FIG. 2 can deal with an abnormal working condition to some extent, the conversion circuit still has the following problems: First, the added switch S causes a specific conduction loss, and addition of S results in a longer circuit loop, and further increases voltage stresses on an IGBT and a diode. Second, when the added diode D6 clamps T4 to the negative voltage source of the bus, if a value difference is comparatively large between an original voltage between the two ends of the flying capacitor Cfly and a half bus voltage (namely, Vbus/2) that is obtained after a sudden change, a charging process of the flying capacitor Cfly causes a comparatively large current shock to devices such as the flying capacitor Cfly, the diode D6, and the Cbus-. This reduces reliability of the devices.

Based on the problem presented in the background, embodiments of this application provide a DC-DC converter, to resolve the prior-art problem that it is difficult for a three-level DC-DC conversion circuit to deal with an abnormal working condition.

The following further describes in detail the embodiments of this application with reference to the accompanying drawings.

It should be noted that "a plurality of" in the embodiments of this application means two or more than two. In addition, in descriptions of this application, terms such as "first" and "second" are merely intended for distinguishment and description, and shall neither be understood as indicating or implying relative importance, nor be understood as indicating or implying a sequence.

Figure 3:
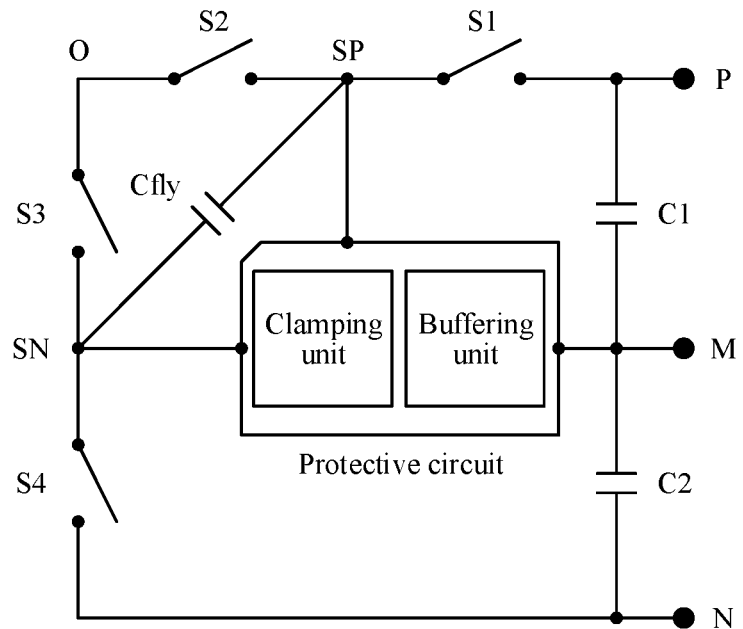
FIG. 3 is a schematic structural diagram of a first DC-DC converter according to an embodiment of this application.

FIG. 3 is a schematic structural diagram of a DC-DC converter according to an embodiment of this application. As shown in FIG. 3, the DC-DC converter includes a first switch device S1, a second switch device S2, a third switch device S3, a fourth switch device S4, a first capacitor C1, a second capacitor C2, a flying capacitor Cfly, and a protective circuit. One end of the first capacitor C1 is connected to a positive end P of a bus, and the other end of the first capacitor C1 is connected to an intermediate node M of the bus. One end of the second capacitor C2 is connected to the intermediate node M of the bus, and the other end of the second capacitor C2 is connected to a negative end N of the bus. One end of the first switch device S1 is connected to the positive end P of the bus, and another end of the first switch device S1 is connected to a first intermediate node SP. One end of the second switch device S2 is connected to the first intermediate node SP, and another end of the second switch device S2 is connected to a reference end O. One end of the third switch device S3 is connected to the reference end O, and another end of the third switch device S3 is connected to a second intermediate node SN. One end of the fourth switch device S4 is connected to the second intermediate node SN, and another end of the fourth switch device S4 is connected to the negative end N of the bus. A positive end of the flying capacitor Cfly is connected to the first intermediate node SP, and a negative end of the flying capacitor Cfly is connected to the second intermediate node SN. The first intermediate node SP and the second intermediate node SN are connected to the intermediate node M of the bus by using the protective circuit.

In the DC-DC converter shown in FIG. 3, the protective circuit includes a clamping unit and a buffering unit. The clamping unit is configured to: when a voltage between the positive end P of the bus and the negative end N of the bus increases, clamp the first switch device S1 to a voltage of the first capacitor C1, and clamp the fourth switch device S4 to a voltage of the second capacitor C2. The buffering unit is configured to reduce, when the voltage between the positive end P of the bus and the negative end N of the bus increases, a current flowing through the clamping unit and the flying capacitor Cfly.

In the DC-DC converter shown in FIG. 3, with turn-on and turn-off of the first switch device S1, the second switch device S2, the third switch device S3, and the fourth switch device S4, the reference end O may have a plurality of level states. Therefore, the DC-DC converter provided in this embodiment of this application may be considered as a multi-level DC-DC converter.

Figure 4:
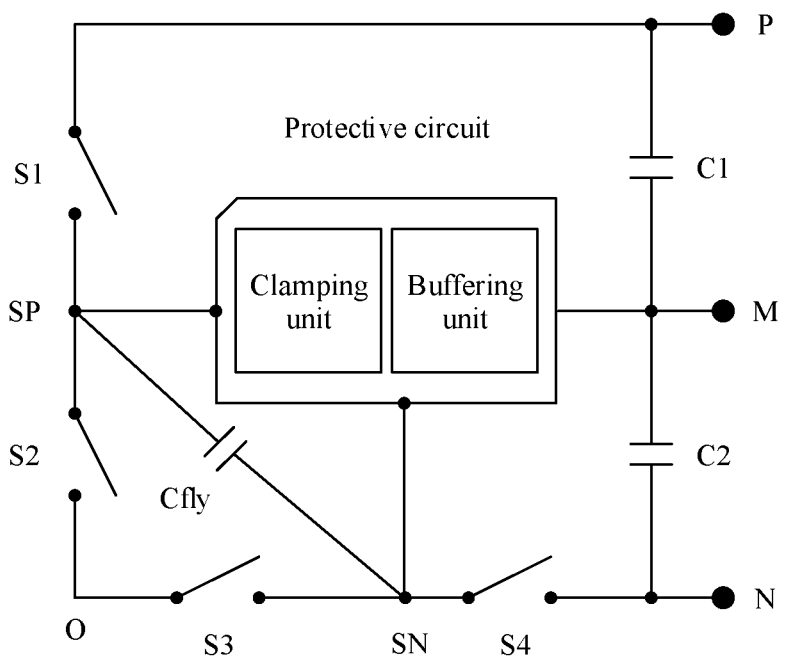
FIG. 4 is a schematic structural diagram of a second DC-DC converter according to an embodiment of this application.

It should be noted that the DC-DC converter shown in FIG. 3 is merely an example. In another example, the DC-DC converter provided in the embodiments of this application may be alternatively shown in FIG. 4. A difference between the DC-DC converter shown in FIG. 4 and the DC-DC converter shown in FIG. 3 lies in different switch device distribution at the positive end of the bus and the negative end of the bus, and a connection relationship between the devices remains unchanged.

Figure 5:
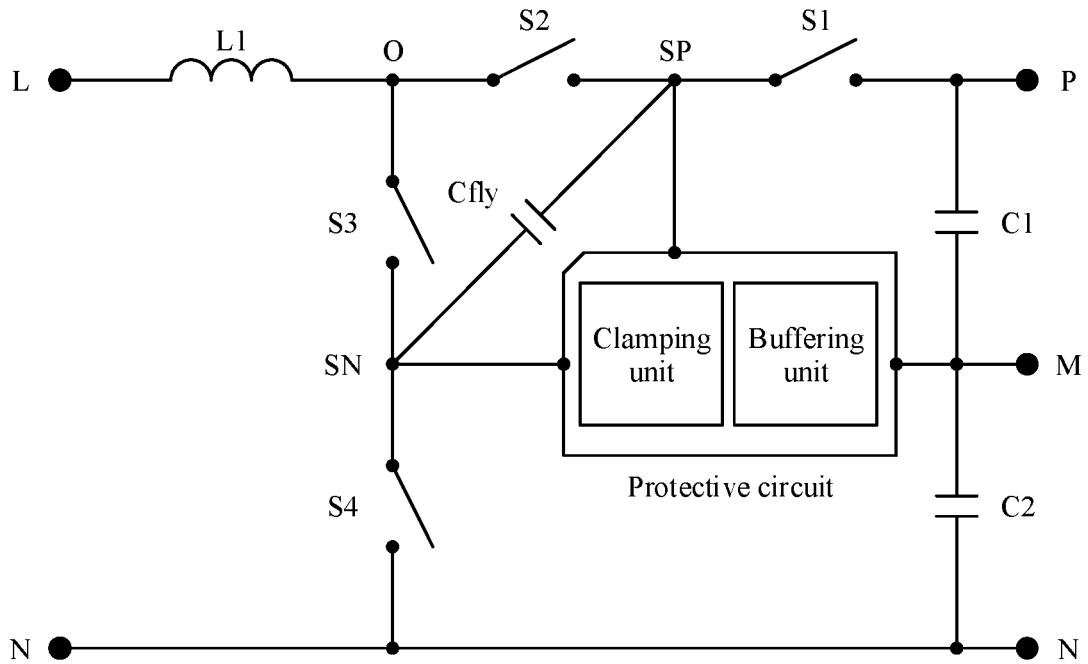
FIG. 5 is a schematic structural diagram of a third DC-DC converter according to an embodiment of this application.
Figure 6:
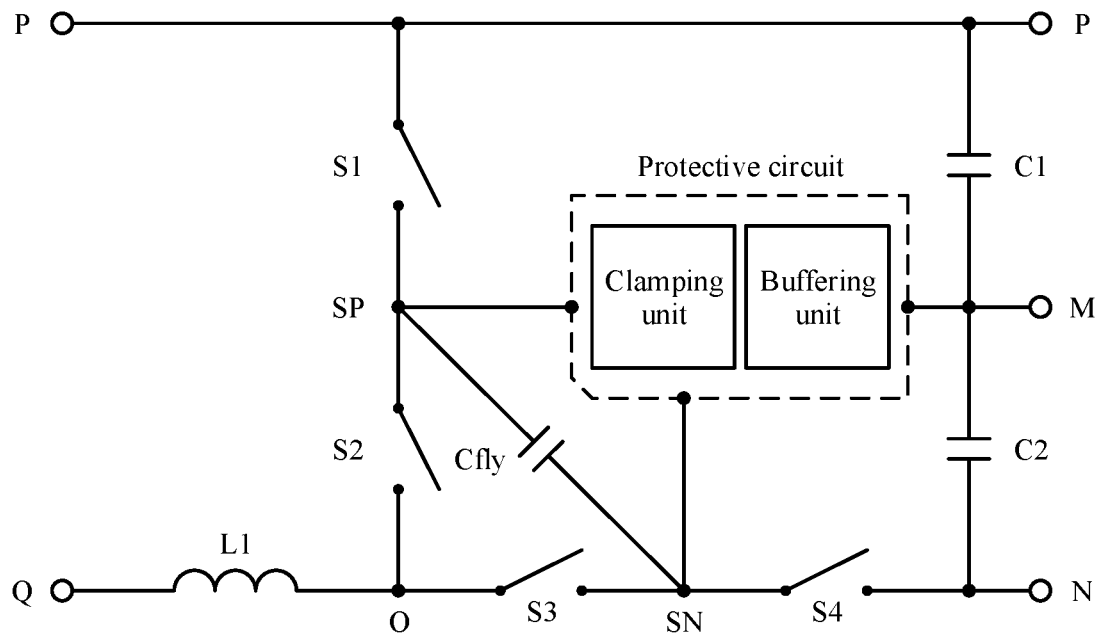
FIG. 6 is a schematic structural diagram of a fourth DC-DC converter according to an embodiment of this application.

In addition, the DC-DC converter provided in the embodiments of this application may further include a first inductor. For the example in FIG. 3, one end of the first inductor L1 is connected to a low-voltage positive end L, the other end of the first inductor L1 is connected to the reference end O, and the negative end N of the bus is coupled to a low-voltage negative end N, as shown in FIG. 5. For the example in FIG. 4, one end of the first inductor L1 is connected to a low-voltage negative end Q, the other end of the first inductor L1 is connected to the reference end O, and the positive end P of the bus is coupled to a low-voltage positive end P, as shown in FIG. 6.

The foregoing provides several examples of DC-DC converters in FIG. 3 to FIG. 6 based on the connection relationship between the devices in the embodiments of this application. Differences between the foregoing several examples lie only in a location of the first inductor L1 and switch device distribution at the positive end of the bus and the negative end of the bus. The DC-DC converters in the foregoing several examples have a same control policy and a same working principle. Therefore, in the embodiments of this application, the DC-DC converter shown in FIG. 5 is mainly used to describe specific composition, the control policy, and the working principle of the DC-DC converter provided in the embodiments of this application. For other examples, reference may be correspondingly made.

In an application, the DC-DC converter shown in FIG. 5 may be a unidirectional converter, or may be a bidirectional converter. In an example, the low-voltage positive end L and the low-voltage negative end N may be connected to a photovoltaic module, and the positive end P of the bus and the negative end N of the bus may be connected to a device. In another example, the low-voltage positive end L and the low-voltage negative end N may be connected to a battery component, and the positive end P of the bus and the negative end N of the bus may be connected to a device.

When the DC-DC converter is the bidirectional converter, if the positive end P of the bus and the negative end N of the bus are used as input ends, the low-voltage positive end L and the low-voltage negative end N are used as output ends. In this case, the DC-DC converter is configured to convert a direct current voltage between the positive end P of the bus and the negative end N of the bus into a direct current voltage between the low-voltage positive end L and the low-voltage negative end N. For example, the device may charge the battery component by using the DC-DC converter. Alternatively, if the low-voltage positive end L and the low-voltage negative end N are used as input ends, the positive end P of the bus and the negative end N of the bus are used as output ends. In this case, the DC-DC converter is configured to convert a direct current voltage between the low-voltage positive end L and the low-voltage negative end N into a direct current voltage between the positive end P of the bus and the negative end N of the bus. For example, the photovoltaic module/battery component may supply power to the device by using the DC-DC converter.

When the DC-DC converter is the unidirectional converter, the positive end P of the bus and the negative end N of the bus may be used as input ends, and the low-voltage positive end L and the low-voltage negative end N are used as output ends.

In the embodiments of this application, if the DC-DC converter is the bidirectional converter, the first switch device, the second switch device, the third switch device, and the fourth switch device each include an IGBT and an anti-parallel diode of the IGBT, or an MOSFET and a body diode of the MOSFET. If the DC-DC converter is the unidirectional converter, for the DC-DC converters shown in FIG. 3 and FIG. 5, the first switch device and the second switch device each include an IGBT and an anti-parallel diode of the IGBT or an MOSFET and a body diode of the MOSFET, the third switch device and the fourth switch device each include a diode, and in this case, the DC-DC converter may be considered as a buck (buck) circuit in which the positive end P of the bus and the negative end N of the bus are used as input ends and the low-voltage positive end L and the low-voltage negative end N are used as output ends; for the DC-DC converters shown in FIG. 4 and FIG. 6, the first switch device and the second switch device each include a diode, the third switch device and the fourth switch device each include an IGBT and an anti-parallel diode of the IGBT or an MOSFET and a body diode of the MOSFET, and in this case, the DC-DC converter may be considered as a buck circuit in which the positive end P of the bus and the negative end N of the bus are used as input ends and the low-voltage positive end P and the low-voltage negative end Q are used as output ends.

In addition, in the embodiments of this application, the protective circuit is further configured to precharge the flying capacitor Cfly when the DC-DC converter starts. For example, when the DC-DC converter is started from the low-voltage positive end L, the flying capacitor Cfly may be precharged from the low-voltage positive end L through the following loop: the second switch device S2→the protective circuit→the intermediate node M of the bus→the negative end N of the bus. This avoids a problem that a precharging circuit needs to be additionally disposed in the DC-DC conversion circuit shown in FIG. 1, thereby reducing costs.

When the low-voltage positive end L is mistakenly connected to a negative voltage, a voltage at the negative end N of the bus is 0 V, a voltage at the low-voltage positive end L is the negative voltage, S3 and S4 are turned on, and a voltage of the second intermediate node SN is 0 V. Because the DC-DC converter has not yet started working, and the flying capacitor Cfly is not yet precharged, a voltage between the two ends of Cfly is 0 V. Therefore, a voltage of the first intermediate node SP is also 0 V. In this case, if C1 and C2 already have voltages, the flying capacitor Cfly is charged through the following loop: the intermediate node M of the bus→the protective circuit→SP→SN→S4, and finally charged to a voltage equal to that of C2. In addition, S1 is clamped by the protective circuit to a voltage of C1, thereby avoiding a risk of overvoltage damage.

When a voltage at the positive end P of the bus suddenly jumps up, the flying capacitor Cfly may be charged by using the protective circuit. The clamping unit in the protective circuit clamps S1 to a voltage of the first capacitor C1, and clamps S4 to a voltage of the second capacitor C2, thereby reducing a risk of overvoltage damage to S1 and S4. In addition, the buffering unit in the protective circuit reduces a current shock during charging of the flying capacitor Cfly, thereby improving reliability of each device in a charging loop.

In addition, in the embodiments of this application, when the DC-DC converter works normally and performs voltage equalization control on the flying capacitor Cfly, a voltage of the flying capacitor Cfly may be further adjusted by adjusting turn-on and turn-off times of the first switch device S1, the second switch device S2, the third switch device S3, and the fourth switch device S4. In the embodiments of this application, after the DC-DC converter is started, a voltage between the two ends of the flying capacitor is greater than a voltage of the first capacitor C1 and greater than a voltage of the second capacitor C2.

When a voltage between the two ends of the flying capacitor is greater than a voltage of the first capacitor and greater than a voltage of the second capacitor, if an abnormal working condition in which a voltage at the positive end P of the bus suddenly jumps up occurs, during charging of the flying capacitor Cfly, a difference between a final charging voltage and an instantaneous voltage that is of the flying capacitor and that is generated when the abnormal working condition occurs is further reduced, and therefore, a current shock during charging of the flying capacitor Cfly can be reduced. This further improves reliability of each device in the charging loop. In addition, when a voltage between the two ends of the flying capacitor is greater than a voltage of the first capacitor and greater than a voltage of the second capacitor, during normal working of the DC-DC converter, a voltage of the intermediate node M of the bus is less than a voltage of the first intermediate node SP and is greater than a voltage of the second intermediate node SN, and a clamping unit in the protective circuit cannot be turned on; therefore, the protective circuit does not participate in normal working of the DC-DC converter. In other words, the protective circuit protects a device in the DC-DC converter only when an abnormal working condition occurs, and the protective circuit does not participate in working when the DC-DC converter works normally.

In the embodiments of this application, the clamping unit may include a first clamping device and a second clamping device. One end of the first clamping device is connected to the first intermediate node, and another end of the first clamping device is connected to the second clamping device. One end of the second clamping device is connected to the second intermediate node, and another end of the second clamping device is connected to the first clamping device. One end of the buffering unit is connected to a connection node between the first clamping device and the second clamping device, and another end of the buffering unit is connected to the intermediate node of the bus.

The first clamping device may be a first diode, and the second clamping device may be a second diode. Alternatively, the first clamping device may be a first insulated gate bipolar transistor IGBT and a diode that is anti-parallel connected to the first IGBT, and the second clamping device may be a second IGBT and a diode that is anti-parallel connected to the second IGBT. Alternatively, the first clamping device may be a first metal-oxide semiconductor field-effect transistor MOSFET and a body diode of the first MOSFET, and the second clamping device may be a second MOSFET and a body diode of the second MOSFET. A cathode of the diode in the first clamping device is connected to the first intermediate node, and an anode of the diode in the first clamping device is connected to a cathode of the diode in the second clamping device. An anode of the diode in the second clamping device is connected to the second intermediate node.

It is not difficult to learn that each of the first clamping device and the second clamping device includes a diode (for example, the first clamping device includes the first diode and the second clamping device includes the second diode, or the first clamping device includes the anti-parallel diode of the IGBT and the second clamping device includes the anti-parallel diode of the IGBT, or the first clamping device includes the body diode of the MOSFET and the second clamping device includes the body diode of the MOSFET), the two diodes are connected in series between the first intermediate node SP and the second intermediate node SN, and an intermediate node between the two diodes is connected to the intermediate node M of the bus by using the buffering unit.

Figure 7:
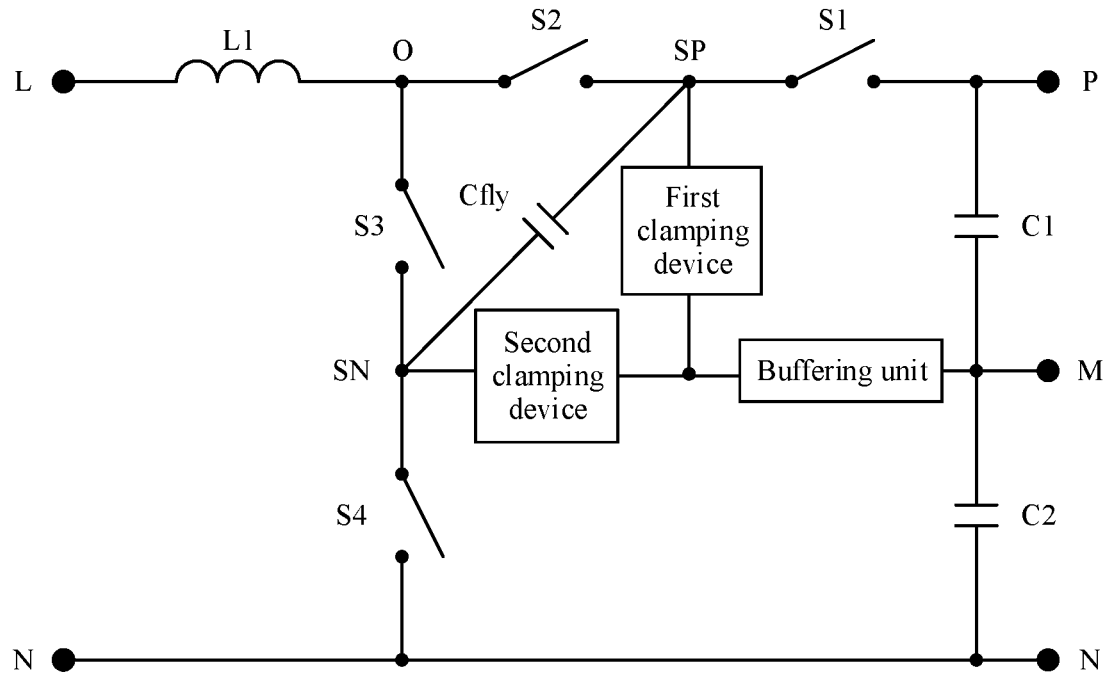
FIG. 7 is a schematic structural diagram of a fifth DC-DC converter according to an embodiment of this application.

Using the DC-DC converter shown in FIG. 5 as an example, specific composition of the protective circuit may be shown in FIG. 7.

The buffering unit includes at least one of the following: a first buffer resistor; a third IGBT and a diode that is anti-parallel connected to the third IGBT, and a fourth IGBT and a diode that is anti-parallel connected to the fourth IGBT, where the third IGBT and the fourth IGBT are connected in opposite direction; a third MOSFET and a body diode of the third MOSFET, and a fourth MOSFET and a body diode of the fourth MOSFET, where the third MOSFET and the fourth MOSFET are connected in opposite direction; or a second buffer resistor, a third buffer resistor, and a fifth switch device, where the second buffer resistor and the third buffer resistor are connected in series, and the fifth switch device and the third buffer resistor are connected in parallel. The fifth switch device is any one of the following: a mechanical switch device; a fifth IGBT and a diode that is anti-parallel connected to the fifth IGBT; or a fifth MOSFET and a body diode of the fifth MOSFET.

In other words, a main body of the buffering unit is a resistor, and a specific form of the resistor may be a resistor with a fixed resistance value, may be an adjustable resistor implemented by using an IGBT and a diode that is anti-parallel connected to the IGBT, may be an adjustable resistor implemented by using an MOSFET and a body diode of the MOSFET, or may be an adjustable resistor adjusted by using a switch device.

Figure 8:
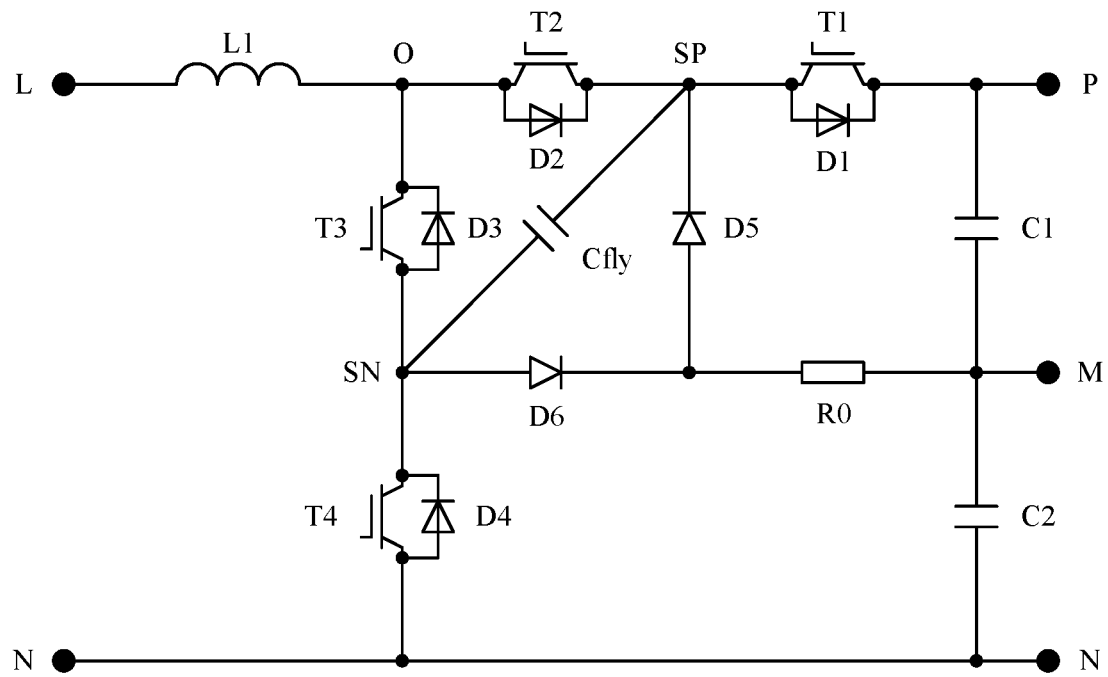
FIG. 8 is a schematic structural diagram of a sixth DC-DC converter according to an embodiment of this application.

In an example, if the DC-DC converter provided in the embodiments of this application is the bidirectional converter, the first clamping device is the first diode, the second clamping device is the second diode, and the buffering unit includes the first buffer resistor, a possible schematic structural diagram of the DC-DC converter may be shown in FIG. 8. In the DC-DC converter shown in FIG. 8, T1 and D1 constitute the first switch device, T2 and D2 constitute the second switch device, T3 and D3 constitute the third switch device, T4 and D4 constitute the fourth switch device, D5 is the first diode, D6 is the second diode, and R0 is the buffering unit. The DC-DC converter shown in FIG. 8 may be considered as an example of the DC-DC converter shown in FIG. 3 or FIG. 5.

It should be noted that, in the example in FIG. 8, an IGBT and a diode that is anti-parallel connected to the IGBT is used as an example to illustrate specific composition of the switch device. In actual application, the switch device may alternatively include an MOSFET and a body diode of the MOSFET. In addition, in the examples in the embodiments of this application, functions of the MOSFET and the body diode of the MOSFET are similar to those of the IGBT and the anti-parallel diode of the IGBT. The MOSFET and the body diode of the MOSFET and the IGBT and the anti-parallel diode of the IGBT may be interchanged.

Figure 9:
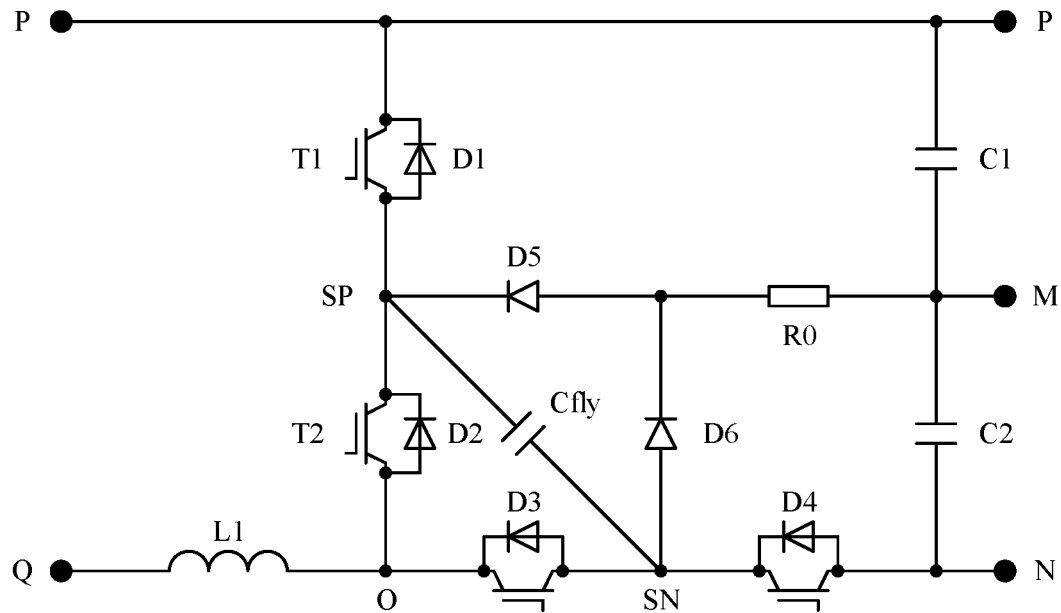
FIG. 9 is a schematic structural diagram of a seventh DC-DC converter according to an embodiment of this application.

In an example, if the DC-DC converter provided in the embodiments of this application is the bidirectional converter, the first clamping device is the first diode, the second clamping device is the second diode, and the buffering unit includes the first buffer resistor, a possible schematic structural diagram of the DC-DC converter may be shown in FIG. 9. In the DC-DC converter shown in FIGS. 9, T1 and D1 constitute the first switch device, T2 and D2 constitute the second switch device, T3 and D3 constitute the third switch device, T4 and D4 constitute the fourth switch device, D5 is the first diode, D6 is the second diode, and R0 is the buffering unit. The DC-DC converter shown in FIG. 9 may be considered as an example of the DC-DC converter shown in FIG. 4 or FIG. 6.

Figure 10:
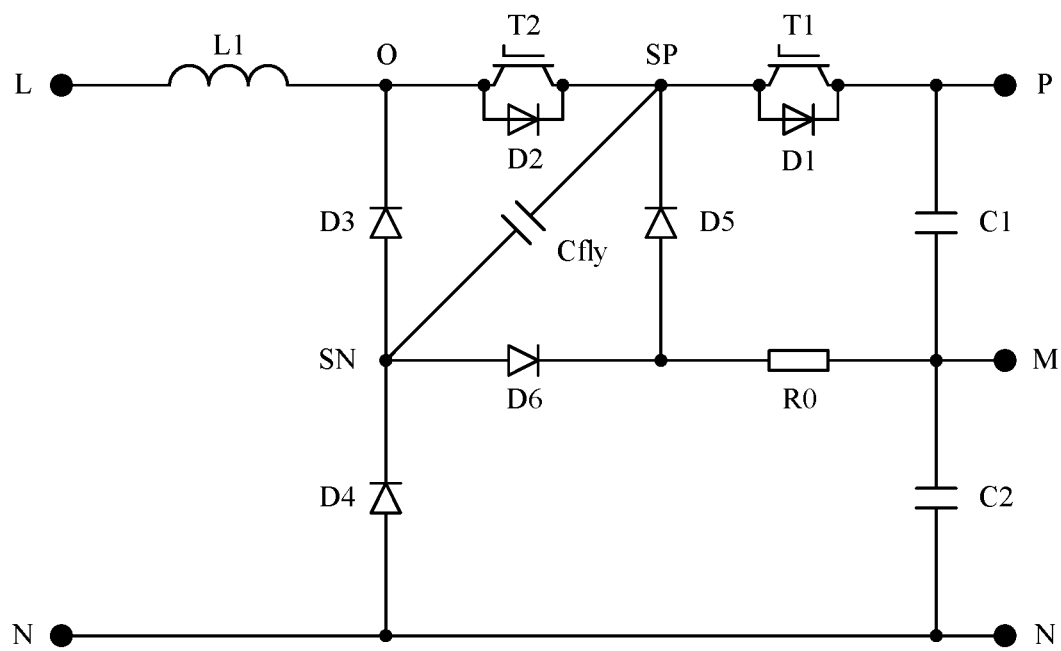
FIG. 10 is a schematic structural diagram of an eighth DC-DC converter according to an embodiment of this application.

In an example, if the DC-DC converter provided in the embodiments of this application is the unidirectional converter, the first clamping device is the first diode, the second clamping device is the second diode, and the buffering unit includes the first buffer resistor, a possible schematic structural diagram of the DC-DC converter may be shown in FIG. 10. In the DC-DC converter shown in FIGS. 10, T1 and D1 constitute the first switch device, T2 and D2 constitute the second switch device, D3 is the third switch device, D4 is the fourth switch device, D5 is the first diode, D6 is the second diode, and R0 is the buffering unit. The DC-DC converter shown in FIG. 10 may be considered as an example of the DC-DC converter shown in FIG. 3 or FIG. 5.

Figure 11:
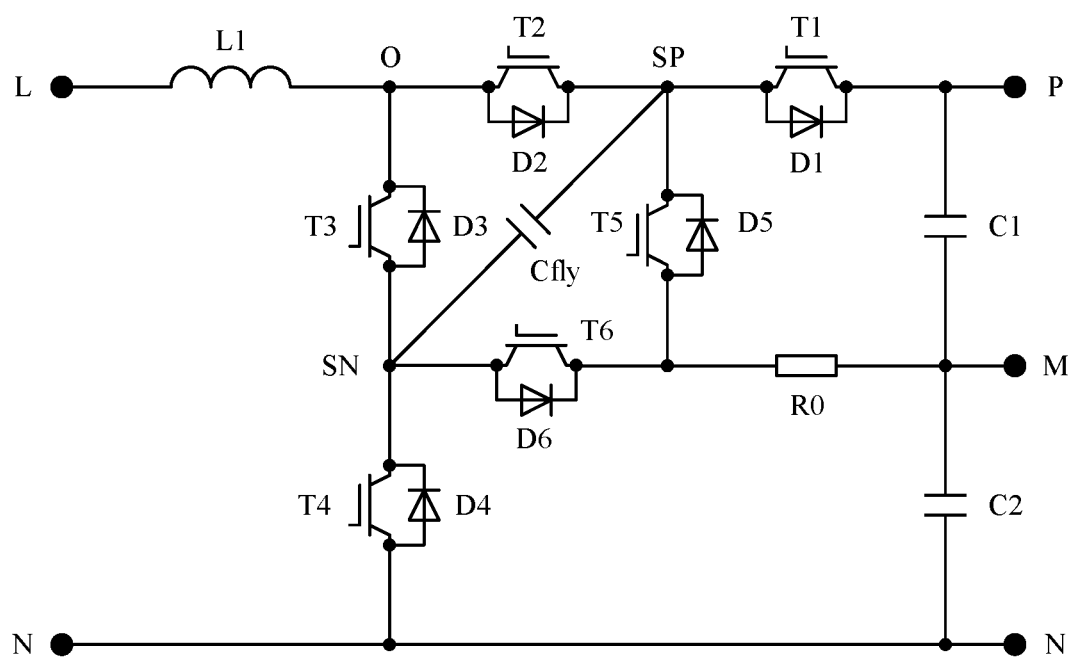
FIG. 11 is a schematic structural diagram of a ninth DC-DC converter according to an embodiment of this application.

Further, in the DC-DC converter shown in FIG. 8, alternatively, the first clamping device may include a first MOSFET and a body diode of the first MOSFET, and the second clamping device may include a second MOSFET and a body diode of the second MOSFET; alternatively, the first clamping device includes a first IGBT and a diode that is anti-parallel connected to the first IGBT, and the second clamping device includes a second IGBT and a diode that is anti-parallel connected to the second IGBT. Certainly, in actual application, the first clamping device may be an MOSFET and a body diode of the MOSFET, and the second clamping device may be an IGBT and a diode that is anti-parallel connected to the IGBT; alternatively, the first clamping device may be an IGBT and a diode that is anti-parallel connected to the IGBT, and the second clamping device may be an MOSFET and a body diode of the MOSFET. In an example, a possible schematic structural diagram of the DC-DC converter may be shown in FIG. 11. In the DC-DC converter shown in FIG. 11, the first clamping device includes an IGBT (namely, T5) and a diode (namely, D5) that is anti-parallel connected to the IGBT, and the second clamping device includes an IGBT (namely, T6) and a diode (namely, D6) that is anti-parallel connected to the IGBT.

Figure 12:
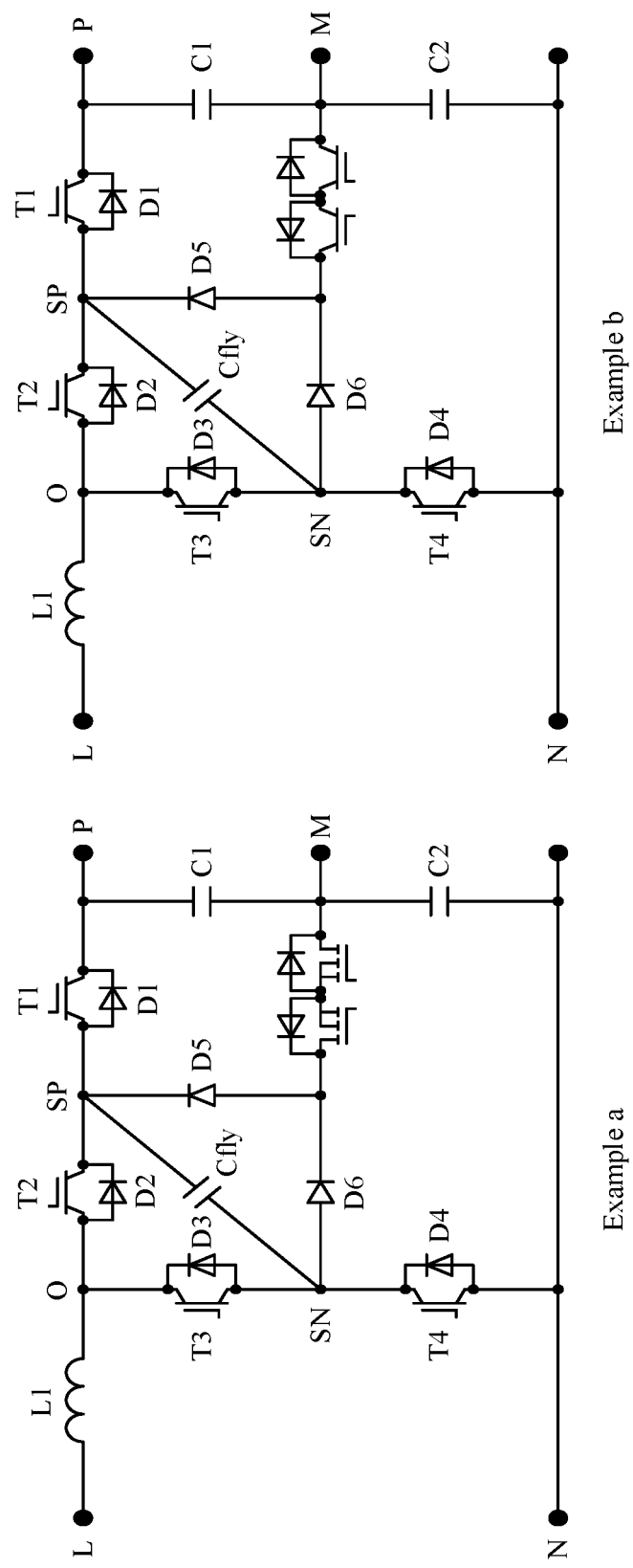
FIG. 12 is a schematic structural diagram of a tenth DC-DC converter according to an embodiment of this application.

Further, in the DC-DC converter shown in FIG. 8, the buffering unit may alternatively include two MOSFETs connected in opposite direction and body diodes of the two MOSFETs, as shown in an example a in FIG. 12; or the buffering unit may alternatively include two IGBTs connected in opposite direction and diodes that are respectively anti-parallel connected to the two IGBTs, as shown in an example b in FIG. 12.

Further, in the DC-DC converter shown in FIG. 8, the buffering unit may alternatively include the second buffer resistor, the third buffer resistor, and the fifth switch device, where the second buffer resistor and the third buffer resistor are connected in series, and the fifth switch device and the third buffer resistor are connected in parallel. The fifth switch device may be the mechanical switch device, the fifth IGBT and the diode that is anti-parallel connected to the fifth IGBT, or the fifth MOSFET and the body diode of the fifth MOSFET. In an example, a possible schematic structural diagram of the DC-DC converter may be shown in FIG. 13.

Figure 13:
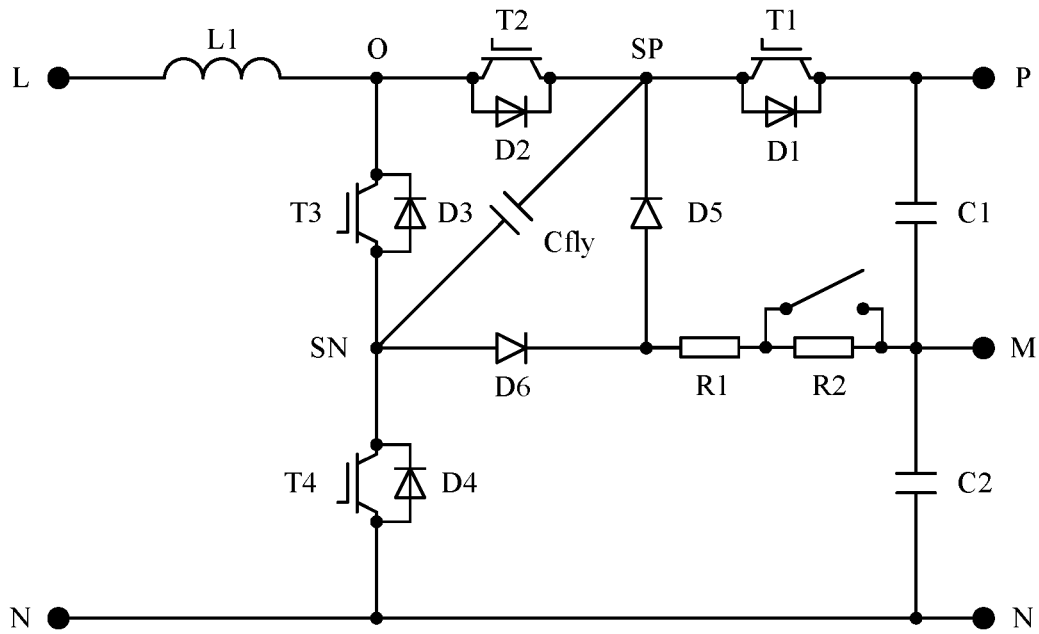
FIG. 13 is a schematic structural diagram of an eleventh DC-DC converter according to an embodiment of this application.

In FIG. 13, the second buffer resistor is R1, the third buffer resistor is R2, and the fifth switch device is the mechanical switch device.

For the examples of the DC-DC converter in this application, working principles thereof may be cross-referenced. The following uses the DC-DC converter shown in FIG. 8 as an example, to describe working principles of the DC-DC converter provided in the embodiments of this application during precharging, in an abnormal working condition, and during normal working. For other examples, refer to this example. Details are not described in the embodiments of this application again.

Figure 14:
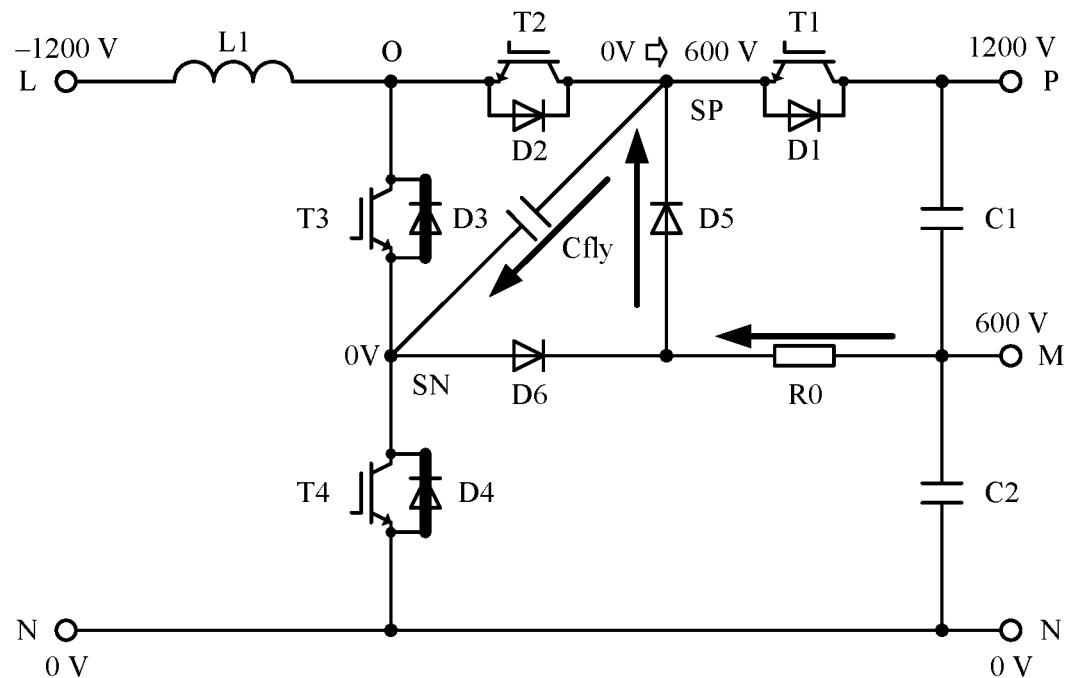
FIG. 14 is a schematic diagram of a working state of a DC-DC converter according to an embodiment of this application in an abnormal working condition.

FIG. 14 shows a working condition when the low-voltage positive end L of the DC-DC converter shown in FIG. 8 is connected to a negative voltage, that is, a working condition when the low-voltage positive end L and the low-voltage negative end N are reversely connected before the DC-DC converter starts. In this case, a voltage at the low-voltage negative end N is 0 V, a voltage at the low-voltage positive end L is the negative voltage, D3 and D4 are turned on, and a voltage of the second intermediate node SN is 0 V. Because the DC-DC converter has not yet started working, and the flying capacitor Cfly is not yet precharged, a voltage between the two ends of Cfly is 0 V. Therefore, a voltage of the first intermediate node SP is also 0 V. In this case, if C1 and C2 already have voltages, for example, the voltages are both 600 V, a voltage at the positive end P of the bus is 1200 V. If no protective circuit is disposed in the DC-DC converter (that is, the circuit topology shown in FIG. 1), two ends of each of T1 and D1 bear a voltage obtained by subtracting the voltage of the first intermediate node SP from the voltage at the positive end P of the bus, that is, 1200−0=1200 V, and T1 and D1 have a risk of overvoltage damage. In the embodiments of this application, after the protective circuit is added, Cfly may be charged through the following charging path: the intermediate node M of the bus→R0→D5→SP→Cfly→SN, as shown by an arrow direction in FIG. 14, and Cfly is finally charged to a voltage equal to that of C2 (the voltage at the point SP changes from 0 V to 600 V). In addition, T1 and D1 are clamped by R0 and D5 to a voltage (600 V) at two ends of C1, thereby reducing a risk of overvoltage damage to T1 and D1.

Therefore, compared with the conversion circuit shown in FIG. 1, the DC-DC converter shown in FIG. 8 can protect the switch device when the low-voltage positive end L is connected to a negative voltage, thereby reducing a risk of overvoltage damage to the switch device.

Figure 15:
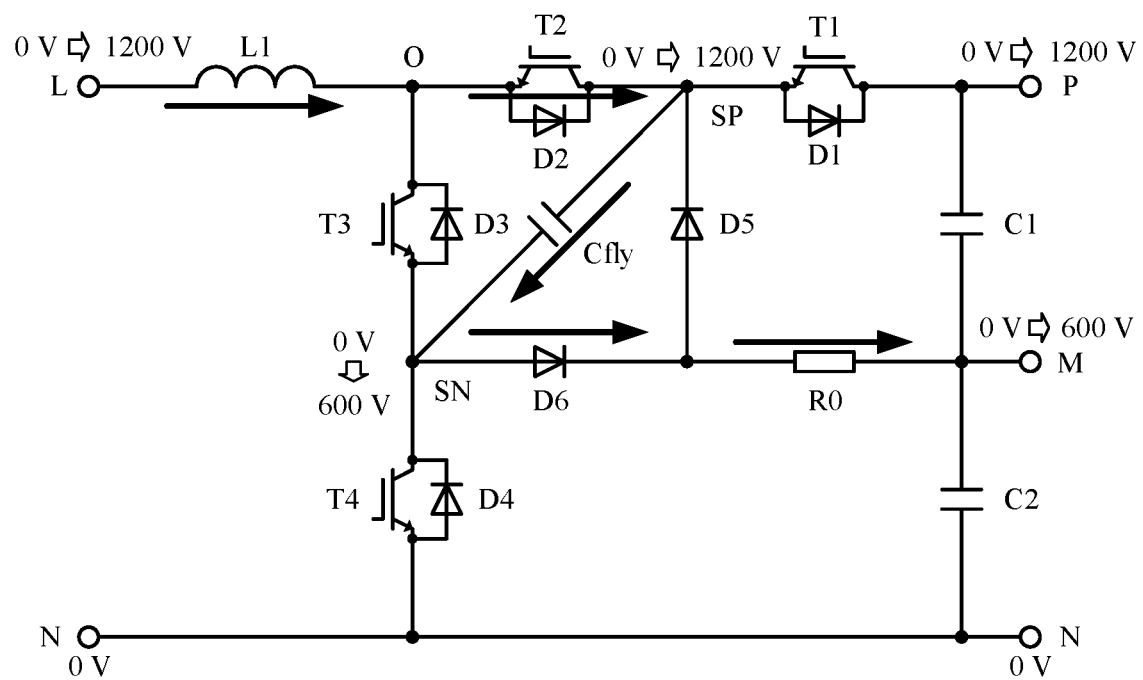
FIG. 15 is a schematic diagram of a working state of a DC-DC converter according to an embodiment of this application when the DC-DC converter starts.

FIG. 15 shows a normal working condition of the DC-DC converter when the DC-DC converter is started from the low-voltage positive end L. In this case, a voltage at the low-voltage negative end N is 0 V, and a voltage at the low-voltage positive end L gradually increases from 0 V to a specific value, for example, 1200 V. In this process, D2 and D1 are turned on, a voltage of the first intermediate node SP follows the voltage at the low-voltage positive end L, and the low-voltage positive end L charges C1 and C2 through D2 and D1, that is, a voltage at the positive end P of the bus also follows the voltage at L. A voltage of the intermediate node M of the bus is divided through a serial connection between C1 and C2. For example, if a parameter of C1 is the same as that of C2, a divided voltage is 600 V. In addition, the flying capacitor Cfly is charged through the following charging path: the low-voltage positive end L→L1→D2→SP→Cfly→SN→D6→R0→M, as shown by an arrow direction in FIG. 15, and is finally charged to a voltage equal to that of C1, so as to complete precharging of the flying capacitor Cfly.

Therefore, compared with the conversion circuit shown in FIG. 1, the DC-DC converter shown in FIG. 8 can complete precharging of the flying capacitor Cfly without proactively driving a switch device. Compared with the prior-art solution shown in FIG. 1, this solution makes a precharging circuit unnecessary, and reduces costs.

Figure 16:
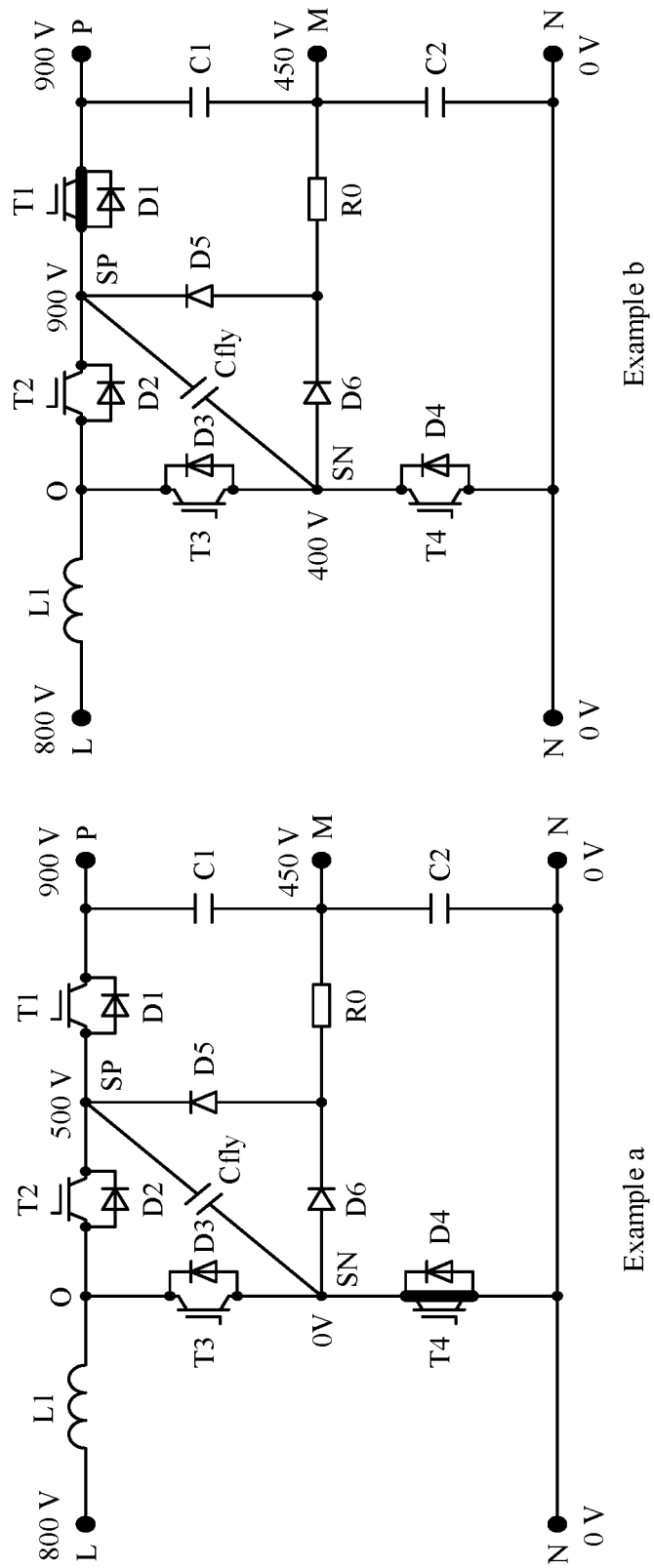
FIG. 16 is a schematic diagram of a working state of a DC-DC converter according to an embodiment of this application during charging of a flying capacitor.

After the DC-DC converter shown in FIG. 8 is normally started, DC-DC conversion may be implemented by adjusting a turn-on time and turn-off time of each switch device in the DC-DC converter. For example, a comparatively small direct current voltage between the low-voltage positive end L and the low-voltage negative end N may be boosted, and a comparatively large direct current voltage is output between the positive end P of the bus and the negative end N of the bus. FIG. 16 shows a normal working condition of the DC-DC converter shown in FIG. 8. In this case, for example, a voltage at the negative end N of the bus is 0 V, a voltage at the low-voltage positive end L is 800 V, a voltage at the positive end P of the bus is 900 V, and when a parameter of C1 is the same as that of C2, a voltage of the intermediate node M of the bus is 450 V. According to the foregoing setting of voltage equalization control on the flying capacitor Cfly, a voltage of the flying capacitor Cfly may be higher than a voltage of C1 and a voltage of C2, for example, may be 500 V.

When T4 or D4 is on, a voltage of the second intermediate node SN is 0 V, and a voltage of the first intermediate node SP is 500 V, as shown in an example a in FIG. 16. In this case, because the voltage of SP is higher than the voltage of M, the first clamping device D5 in the protective circuit is not turned on, and the protective circuit does not participate in normal working of the DC-DC converter.

When T1 or D1 is on, a voltage of the first intermediate node SP is 900 V, and a voltage of the second intermediate node SN is 400 V, as shown in an example b in FIG. 16. In this case, because the voltage of SN is lower than the voltage of M, the second clamping device D6 in the protective circuit is not turned on, and the protective circuit does not participate in normal working of the DC-DC converter.

It can be learned from the foregoing analysis that, in use of the DC-DC converter shown in FIG. 8, due to the voltage control setting of the flying capacitor Cfly, the protective circuit does not participate in working of the DC-DC converter in a normal working condition, so that the DC-DC converter can maintain original performance that the DC-DC converter has before the protective circuit is disposed.

Figure 17:
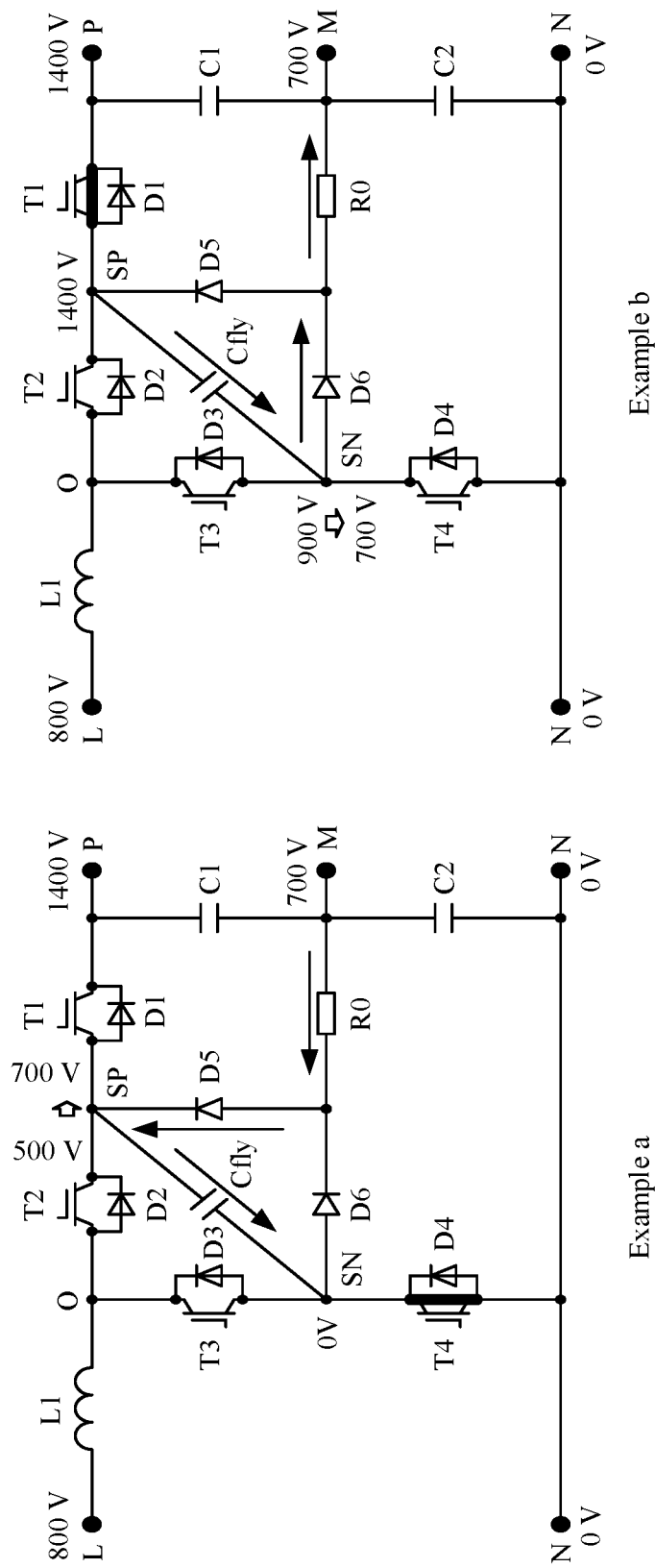
FIG. 17 is a schematic diagram of a working state of a DC-DC converter according to an embodiment of this application in an abnormal working condition.

FIG. 17 shows an abnormal working condition in which a bus voltage of the DC-DC converter suddenly increases. Before the abnormal working condition occurs, the DC-DC converter works in a normal working condition, for example, the working condition shown in FIG. 16. When the abnormal working condition in which the bus voltage suddenly increases occurs, a voltage at the positive end P of the bus suddenly changes to a higher value, for example, 1400 V, and consequently, a voltage of the intermediate node M of the bus suddenly changes to 700 V.

When T4 or D4 is on, a voltage of the second intermediate node SN is 0 V, as shown in an example a in FIG. 17. Because a voltage of the flying capacitor Cfly has not yet suddenly changed, and is still 500 V, that is, a voltage before the abnormal working condition occurs, a voltage of the first intermediate node SP is 500 V. If no protective circuit is disposed in the DC-DC converter (that is, the circuit topology shown in FIG. 1), two ends of each of T1 and D1 bear a voltage of 900 V, and there is a risk of overvoltage damage. In the embodiments of this application, after the protective circuit is added, Cfly may be charged through the following charging path: the intermediate node M of the bus→R0→D5→SP→Cfly→SN, as shown by an arrow direction in the example a in FIG. 17, and the flying capacitor Cfly is finally charged to a voltage of 700 V equal to that of C2. In addition, T1 and D1 are clamped by R0 and D5 to a voltage (700 V) at two ends of C1, thereby avoiding the risk of overvoltage damage.

When T1 or D1 is on, a voltage of the first intermediate node SP is 1400 V, as shown in an example b in FIG. 17. Because a voltage of the flying capacitor Cfly has not yet suddenly changed, and is still 500 V, that is, a voltage before the abnormal working condition occurs, a voltage of the second intermediate node SN is 900 V. If no protective circuit is disposed in the DC-DC converter (that is, the circuit topology shown in FIG. 1), two ends of each of T4 and D4 bear a voltage of 900 V, and there is a risk of overvoltage damage. In the embodiments of this application, after the protective circuit is added, Cfly may be charged through the following charging path: SP→Cfly→SN→D6→R0→M, as shown by an arrow direction in the example b in FIG. 17, and the flying capacitor Cfly is finally charged to a voltage of 700 V equal to that of C1. In addition, T4 and D4 are clamped by D6 and R0 to a voltage (700 V) at two ends of C2, thereby avoiding the risk of overvoltage damage.

Therefore, compared with the conversion circuit shown in FIG. 1, the DC-DC converter shown in FIG. 8 can protect the switch device when the bus voltage suddenly increases, thereby reducing a risk of overvoltage damage to the switch device.

In addition, compared with the conversion circuit shown in FIG. 2, the DC-DC converter shown in FIG. 8 can effectively reduce a current shock during charging of the flying capacitor Cfly because the buffering unit (namely, R0) is disposed in the protective circuit. For example, a magnitude of a charging current may be changed by setting a resistance value of R0. In addition, because a voltage of the flying capacitor Cfly is set to be greater than a voltage between the two ends of C1 and greater than a voltage between the two ends of C2, a difference between an instantaneous voltage that is of the flying capacitor Cfly and that is generated in an abnormal working condition and a final charging voltage can be reduced, thereby further reducing a current shock during charging of the flying capacitor, and improving reliability of each device in the charging loop.

The foregoing describes in detail, by using the DC-DC converter shown in FIG. 8, working states of the DC-DC converter provided in the embodiments of this application during precharging, in a normal working condition, and in an abnormal working condition (the low-voltage positive end L is connected to a negative voltage, or the bus voltage suddenly increases). For a working state of another DC-DC converter provided in the embodiments of this application, a working principle is similar to that of the DC-DC converter shown in FIG. 8, and a difference lies only in some minute adjustment.

For example, a difference between the DC-DC converter shown in FIG. 9 and the DC-DC converter shown in FIG. 8 lies only in switch device distribution, and working principles of the two DC-DC converters are the same. The DC-DC converter shown in FIG. 10 is the unidirectional converter, and working states thereof are the same as those of the DC-DC converter shown in FIG. 8 when the DC-DC converter shown in FIG. 8 is used as a buck circuit. In the DC-DC converter shown in FIG. 11, the first clamping device and the second clamping device are improved based on the DC-DC converter shown in FIG. 8, and a difference lies only in that conduction characteristics (for example, conduction voltage drops) of the first clamping device and the second clamping device in FIG. 11 can be changed, so that adjustment of the DC-DC converter is more flexible, and adjustment requirements in different abnormal working conditions can be met. In the DC-DC converter shown in FIG. 12, the buffering unit is improved based on the DC-DC converter shown in FIG. 8, and a conduction characteristic of the buffering unit in the DC-DC converter can be changed, so that adjustment of the DC-DC converter is more flexible, and adjustment requirements in different abnormal working conditions can be met. In the DC-DC converter shown in FIG. 13, a resistance value of the buffering unit can be adjusted by using a mechanical switch, thereby meeting adjustment requirements in different abnormal working conditions.

Therefore, in the embodiments of this application, working states of only the DC-DC converter shown in FIG. 8 are analyzed in detail. For working states of a DC-DC converter in another example, refer to related descriptions in FIG. 8. Details are not described herein again.

To sum up, in use of the DC-DC converter provided in the embodiments of this application, when the low-voltage positive end is mistakenly connected to a negative voltage, a voltage at the negative end of the bus is 0 V, and a voltage at the low-voltage positive end is the negative voltage; therefore, the third switch device and the fourth switch device are turned on, and a voltage of the second intermediate node is 0 V. Because the DC-DC converter has not yet started working, and the flying capacitor is not yet precharged, a voltage between the two ends of the flying capacitor is 0 V. Therefore, a voltage of the first intermediate node is also 0 V. In this case, if the first capacitor and the second capacitor already have voltages, the flying capacitor is charged from the intermediate node of the bus through the protective circuit, the first intermediate node, and the second intermediate node, and finally charged to a voltage equal to that of the second capacitor. In addition, the first switch device is clamped by the protective circuit to a voltage of the first capacitor, thereby avoiding a risk of overvoltage damage.

When a voltage at the positive end of the bus suddenly jumps up, the flying capacitor may be charged by using the protective circuit. The clamping unit in the protective circuit clamps the first switch device to a voltage of the first capacitor, and clamps the fourth switch device to a voltage of the second capacitor, thereby reducing a risk of overvoltage damage to the first switch device and the fourth switch device. In addition, the buffering unit in the protective circuit reduces a current shock during charging of the flying capacitor, thereby improving reliability of each device in the charging loop.

Apparently, a person skilled in the art can make various modifications and variations to the embodiments of this application without departing from the scope of this application. This application is intended to cover these modifications and variations of the embodiments of this application provided that these modifications and variations fall within the scope of the claims of this application and equivalent technologies thereof.

What is claimed is:
1. A direct current (DC)-DC converter, comprising:
a bus having a positive end, a negative end, and an intermediate node;
a first switch device having one end coupled to the positive end of the bus and another end coupled to a first intermediate node;
a second switch device having one end coupled to the first intermediate node and another end coupled to a reference end;
a third switch device having one end coupled to the reference end and another end coupled to a second intermediate node;
a fourth switch device having one end coupled to the second intermediate node and another end coupled to the negative end of the bus;
a first capacitor having one end coupled to the positive end of the bus and another end coupled to the intermediate node of the bus;
a second capacitor having one end coupled to the intermediate node of the bus and another end coupled to the negative end of the bus;
a flying capacitor having a positive end coupled to the first intermediate node and a negative end coupled to the second intermediate node; and
a protective circuit having a clamping unit and a buffering unit, wherein the first intermediate node and the second intermediate node are coupled to the intermediate node of the bus through the protective circuit.

2. The DC-DC converter according to claim 1, wherein after the DC-DC converter is started up, a voltage between the two ends of the flying capacitor is greater than a voltage of the first capacitor and greater than a voltage of the second capacitor.

3. The DC-DC converter according to claim 1, further comprising:
a first inductor having one end coupled to a low-voltage positive end and another end coupled to the reference end, wherein the negative end of the bus is coupled to a low-voltage negative end; or one end of the first inductor is coupled to a low-voltage negative end, another end of the first inductor is coupled to the reference end, and the positive end of the bus is coupled to the low-voltage positive end.

4. The DC-DC converter according to claim 3, wherein the low-voltage positive end and the low-voltage negative end are input ends of the DC-DC converter, and the positive end of the bus and the negative end of the bus are output ends of the DC-DC converter; or the positive end of the bus and the negative end of the bus are input ends of the DC-DC converter, and the low-voltage positive end and the low-voltage negative end are output ends of the DC-DC converter.

5. The DC-DC converter according to claim 1, wherein the clamping unit comprises a first clamping device and a second clamping device; and
one end of the first clamping device is coupled to the first intermediate node, and another end of the first clamping device is coupled to the second clamping device; one end of the second clamping device is coupled to the second intermediate node, and another end of the second clamping device is coupled to the first clamping device; and one end of the buffering unit is coupled to a connection node between the first clamping device and the second clamping device, and another end of the buffering unit is coupled to the intermediate node of the bus.

6. The DC-DC converter according to claim 5, wherein the first clamping device comprises a first diode, and the second clamping device comprises a second diode.

7. The DC-DC converter according to claim 6, wherein a cathode of the first diode is coupled to the first intermediate node, and an anode of the first diode is coupled to a cathode of the second diode; and wherein an anode of the second diode is coupled to the second intermediate node.

8. The DC-DC converter according to claim 5, wherein the first clamping device comprises a first insulated gate bipolar transistor (IGBT) and a diode that is anti-parallel coupled to the first IGBT, and wherein the second clamping device comprises a second IGBT and a diode that is anti-parallel coupled to the second IGBT.

9. The DC-DC converter according to claim 5, wherein the first clamping device comprises a first metal-oxide semiconductor field-effect transistor (MOSFET) and a body diode of the first MOSFET, and wherein the second clamping device comprises a second MOSFET and a body diode of the second MOSFET.

10. The DC-DC converter according to claim 1, wherein the buffering unit comprises at least one of the following:
    a first buffer resistor;
    a third IGBT and a diode that is anti-parallel coupled to the third IGBT, and a fourth IGBT and a diode that is anti-parallel coupled to the fourth IGBT, wherein the third IGBT and the fourth IGBT are coupled in opposite direction;
    a third MOSFET and a body diode of the third MOSFET, and a fourth MOSFET and a body diode of the fourth MOSFET, wherein the third MOSFET and the fourth MOSFET are coupled in opposite direction; or
    a second buffer resistor, a third buffer resistor, and a fifth switch device, wherein the second buffer resistor and the third buffer resistor are coupled in series, and the fifth switch device and the third buffer resistor are coupled in parallel.

11. The DC-DC converter according to claim 10, wherein the fifth switch device comprises at least one of the following:
    a mechanical switch device;
    a fifth IGBT and a diode that is anti-parallel coupled to the fifth IGBT; or
    a fifth MOSFET and a body diode of the fifth MOSFET.

12. The DC-DC converter according to claim 1, wherein the first switch device, the second switch device, the third switch device, and the fourth switch device each comprise an IGBT and an anti-parallel diode of the IGBT, or an MOSFET and a body diode of the MOSFET.

13. The DC-DC converter according to claim 1, wherein the first switch device and the second switch device each comprise an IGBT and an anti-parallel diode of the IGBT, or an MOSFET and a body diode of the MOSFET, and the third switch device and the fourth switch device each comprise a diode.

14. The DC-DC converter according to claim 1, wherein the first switch device and the second switch device each comprise a diode, and the third switch device and the fourth switch device each comprise an IGBT and an anti-parallel diode of the IGBT, or an MOSFET and a body diode of the MOSFET.

15. The DC-DC converter according to claim 1, wherein the protective circuit is further configured to precharge the flying capacitor when the DC-DC converter is started up.

16. The DC-DC converter according to claim 1, wherein the clamping unit is configured to, when a voltage between the positive end of the bus and the negative end of the bus increases, clamp the first switch device to a voltage of the first capacitor and clamp the fourth switch device to a voltage of the second capacitor.

17. The DC-DC converter according to claim 1, wherein the buffering unit is configured to reduce, when a voltage between the positive end of the bus and the negative end of the bus increases, a current flowing through the clamping unit and the flying capacitor.

* * * * *